Jan. 19, 1954     T. STIEBEL     2,666,836
ELECTRIC CONTROLLER FOR HEATING ELEMENTS
Filed Sept. 5, 1950     3 Sheets-Sheet 1

FIG. I

INVENTOR.
THEODOR STIEBEL
BY
ATTORNEY

Jan. 19, 1954 T. STIEBEL 2,666,836
ELECTRIC CONTROLLER FOR HEATING ELEMENTS
Filed Sept. 5, 1950 3 Sheets-Sheet 2

INVENTOR.
THEODOR STIEBEL
BY
ATTORNEY

Jan. 19, 1954 T. STIEBEL 2,666,836
ELECTRIC CONTROLLER FOR HEATING ELEMENTS
Filed Sept. 5, 1950 3 Sheets-Sheet 3

INVENTOR.
THEODOR STIEBEL
BY
ATTORNEY

Patented Jan. 19, 1954

2,666,836

UNITED STATES PATENT OFFICE 2,666,836

ELECTRIC CONTROLLER FOR HEATING ELEMENTS

Theodor Stiebel, Holzminden, Germany

Application September 5, 1950, Serial No. 183,160

9 Claims. (Cl. 219—20)

This invention relates to an electrical controller for heating plates, and is particularly adapted for use with oven, cooking plates, etc.

In prior known heating elements, control of the electrical energy supplied per unit of time is obtained either by switching to different heating circuits, or by the periodic application of heating current by means of special circuit apparatus. In the former type, a step switch, having three steps most frequently and five steps in special cases, is used. Correspondingly, the heating element consists of three or five heating coils connectable to the supply circuit individually or jointly. Operation of the step switch is at the discretion of the user. In the latter type, the current is periodically connected and disconnected according to its consumption. Heretofore this has been performed manually or by specially devised apparatus operating independently of the heat condition of the heating element. Both types have the disadvantage that the switching sequence is not exactly dependent on the temperature of the heating element and the particular heating requirements.

The invention relates to a particularly simple construction of a controller for periodically connecting and disconnecting the current, in which the control sequence takes place in dependence upon the particular thermal status of the heating element. For this purpose, a thermal probe of the electric controller is disposed in the heating region of the heating element to transmit the effect of its heat to the controller, with the probe exposed to the thermal condition of the entire heating element. The electric controller operates automatically to interrupt the current when a definite temperature is reached, and, when the temperature of the heating element falls through a given temperature differential, again to connect the supply circuit. The limiting temperatures, at which the switching operations of the controller take place, depend on the particular construction of the specific controller. The construction may be such that the heating element has but a single heating coil and the controller incorporates a single switching device. But the construction may also be such that the heating element has a plurality of circuits, in which case the controller has two switching mechanisms operating independently of each other or in dependence upon each other. In such construction, however, both of the switching mechanisms are actuated in response to a single thermal probe, extending into the heating region of both circuits of the heating element. For independent operation, the two switching mechanisms are connected in parallel. When they operate dependent upon each other, they are connected serially so as the one switching mechanism disconnects the supply, the supply circuit is connected through the second switching mechanism.

To render the controller useful for different temperature intervals, that is to meet different operating requirements, there can be inserted between the thermal probe and the switching mechanism an idling stage, the magnitude of the idling stage being variable steplessly.

The instant invention thus results in an arrangement in which the electric controller is so disposed with respect to the electrical heating element that the controller by which current is applied, is directly responsive to the thermal effect of the heating element by means of its thermal probe, and the controller operates dependent on the temperature of the surface of the heating element and the particular heat requirements.

The invention in various specific exemplary forms is illustrated in the accompanying drawings, partially in structural perspective and partially in section, in which.

Figure 6:
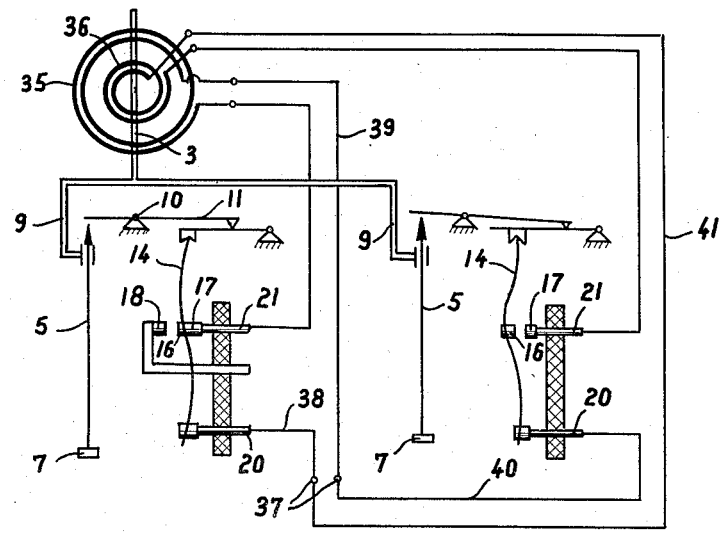
Figure 7:
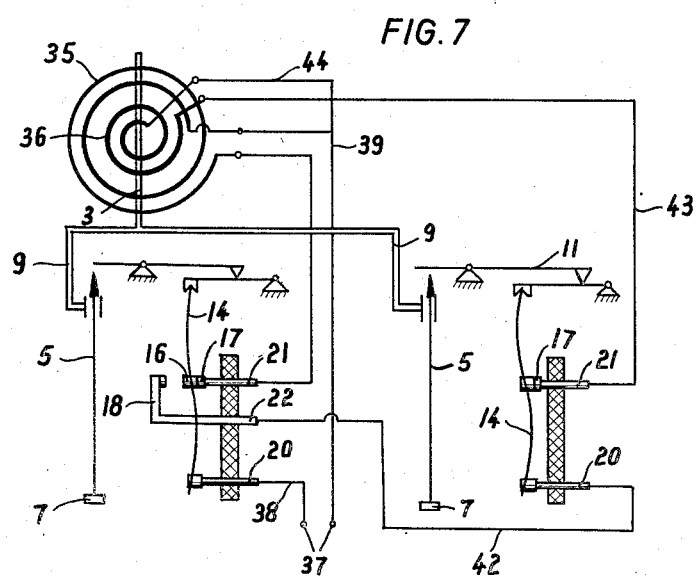

Figure 6 is a schematic drawing showing the electrical connections of a controller of my invention for two heating coils and two switching mechanisms connected in parallel, with one of the switching mechanisms shown in its disconnect stage; and Figure 7 is a schematic drawing showing the electrical connections of a controller of my invention for two heating coils with the two switching mechanisms connected serially.

Figure 1:
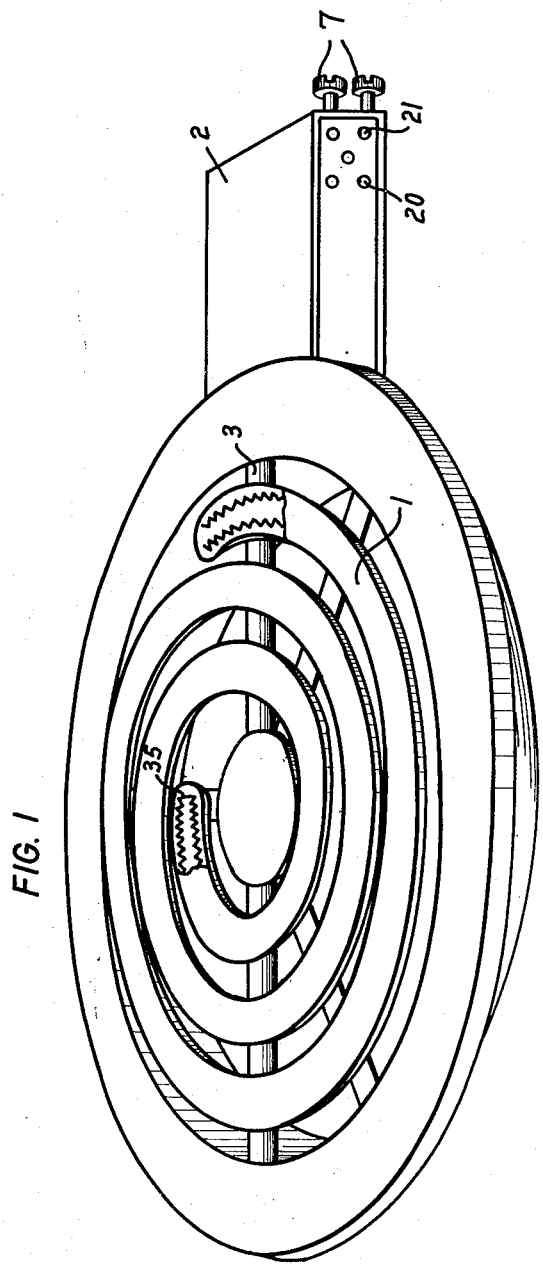
Figure 1 is an embodiment of the electric controller of my invention with a thermal probe in the form of an expansion rod at the electric heating element.
Figure 2:
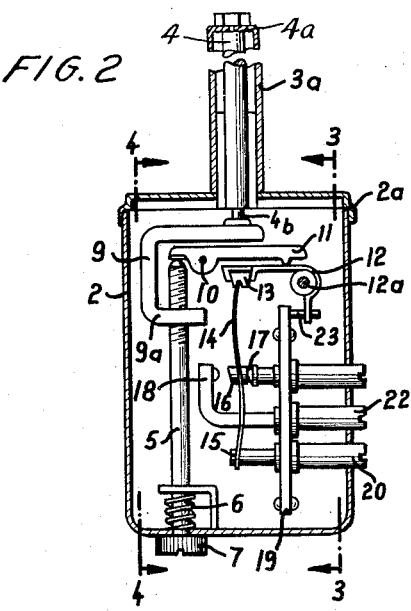
Figure 2 is a horizontal section through the electrical controller and its thermal probe of Figure 1.

Referring to the drawings, in which like reference characters designate like elements, the heating element 1 of an electric cooking or oven plate, has wires 35, serving as heating elements, embedded therein in known manner. The electrical controller 2 is permanently affixed to the cooking plate, respectively the stove frame, and has a thermal probe 3. As shown in Figure 1, this probe is positioned below and across the entire length of a diameter of plate 1, and comprises an outer tube affixed to the housing of the controller with a rod 4, of a material having a coefficient of expansion less than that of the tube 3. One rod end 4a is rigidly connected to the end of tube 3 remote from the controller. Within the controller housing 2, the other end of the rod 4b is welded to an elbow 9, which has a threaded bore at its free bent end 9a. Into the threaded bore is screwed a control pin 5, carrying an operating knob 7 external the housing. Control pin 5 is additionally subjected to the effect of a compression spring 6, to prevent any accidental loosening of the control pin in the threaded bore of the elbow on vibration.

Also mounted in housing 2, a two armed lever 11 is positioned to pivot about an axis 10, which lever in turn actuates a supplemental lever 12, rotatably mounted on pivot 12 and carrying a stop 13, made of a ceramic insulator, in which an end of an S-shaped flat spring 14 is loosely supported. The other end of the spring 14 is mounted in a terminal 15 and carries at its mid-region a contact 16. Normally this contact 16 engages the contact 17 of the current terminal connected to the heating coil. Opposite contact 17 an additional contact 18 on a terminal may be disposed, positioned so that the contact 16 of the spring 14 may engage it on the spring being snapped as hereinafter described. The terminals carrying the contacts 15, 17 and 18, respectively, are rigidly mounted in insulator 19 and externally form the corresponding current supply terminal 20 and the current output terminal 21.

Figure 3:
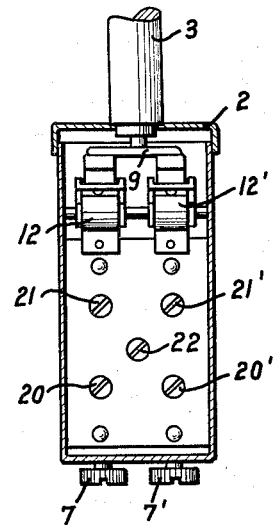
Figure 3 is a section along line 3—3 of Figure 2.

As shown in Figure 3, a second switching device may be provided within the controller housing 2 having elements corresponding respectively to the elements of the first switching device just described, which has as its purpose to control the current at the proper time applied to a second coil 36 (Figures 6 and 7) of the heating element.

Figure 5:
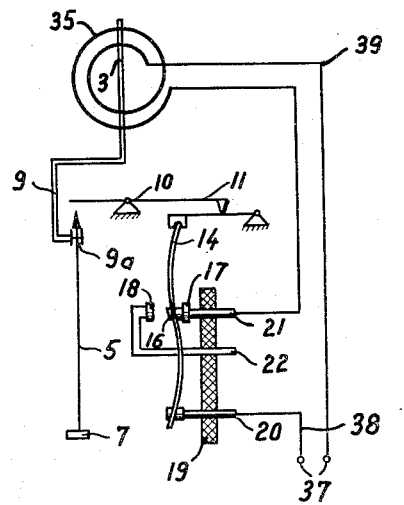
Figure 5 is a schematic drawing showing the electrical circuit of a controller of my invention with one heating element and one switching mechanism.

The electrical circuit of the controller is shown in Figure 5 from which it is readily noted that current is supplied to the heating coil 35 through one supply line terminal 37, through conductor 38, through adjustable controller 2, that is, by current supply terminal 20, spring 14, contact 16, contact 17 and current output terminal 21 to the coil 35, from which conductor 39 leads back to the other line supply terminal 37.

External tube 3, extending through the entire heating region of plate 1, expands different amounts depending upon the different temperatures, and at the same time, rod 4 expands correspondingly lesser amounts. This difference in the expansion of the tube and the rod is used for switching as follows: When tube 3 expands, rod 4 expanding a lesser amount is drawn slightly out of the controller housing 2. Elbow 9, being rigidly affixed to the rod, is moved carrying with it the control pin 5 screwed into the elbow. At a certain instant, control pin 5 presses against lever 11 rotating it about its axis 10. Lever 11 thus in turn presses on lever 12, rotating the latter about its pivot 12a. Support 13 thus presses the spring 14 towards the fixed contact 15, thus tensioning the S-shaped spring in the longitudinal direction. At a certain instant of time, the spring suddenly snaps over, removing contact 16 from contact 17, and interrupting the circuit to the heating element suddenly and in shocklike manner. Thereafter the heating element slowly cools, tube 3 contracts, rod 4 returns into housing 2 and the control pin 5 is removed from lever 11. The load is thus removed from levers 11 and 1e, and spring 14 may again expand to that instant of time at which, as the result of its S-shape, it snaps over, and contacts 16 and 17 again engage each other. Thereby the circuit to the heating coil is again closed.

Undesirable stretching of spring 14 is prevented by the stop 23 which limits the rotary motion of lever 12. The instants of circuit interruption and circuit restoration may be regulated by the adjustment of knob 7 and pin 5 in elbow 9 as required. As clearly shown in the drawings, by appropriate adjustment of knob 7, and thus of the pin 5 in elbow 9, an idling interval of a predetermined magnitude may be introduced between pin 5 and lever 11. For example, the further the pin 5 is screwed downwardly in Figure 1, the later does the interrupting action of lever 11 and the switching mechanism take place, that is, the higher may the temperature of the heating element become. Also, by corresponding adjustment of knob 7, continued insertion of the controller is obtainable.

If the embodiment of the controller is such that the contact 18 is provided opposite the contact 17 so that when contact 16 on spring 14 leaves contact 17, it snaps to engage contact 18, various possibilities are offered. Thus a low magnitude current supply, as compared to that supplied through contact 17 to the heating element, could be connected through contact 18, etc. In what is hereinafter described, I use this embodiment for the multistage form of my controller.

Figure 4:
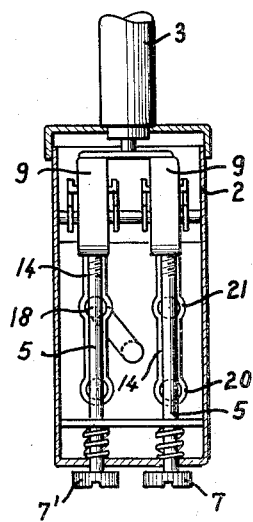
Figure 4 is a section along line 4—4 of Figure 2.

In the preceding, there has been described a controller having but one switching mechanism. There are advantages, however, in providing the controller initially with two adjacently positioned switching mechanisms as shown in Figures 3 and 4, the heating element 1 being provided with two heating coils 35 and 36. However, only one thermal probe 3 is provided and subjected to the direct heating influence of both circuits 35 and 36.

The arrangement can be such that both switching mechanisms are connected independently, that is, in parallel to each other, and both connected to the single thermal probe. Such connection is shown in Figure 6, in which the thermal probe is provided with two elbows 9 connected through a cross member 9b. An adjusting pin 5 is screwed into each elbow and each has an individual adjusting knob 7. The remaining elements, 10 to 17, are each provided in duplicate. Insulating plate 19, in such construction, is provided with two additional terminals, 20 and 21, for the second circuit, conductor 40, heating coil 36, and conductor 41. In operation, and assuming both of the springs 14 are in such position that their respective contacts 16 engage their contacts 17, both heating coils 35 and 36 have current flowing therein. When the thermal probe correspondingly expands, the one adjusting pin 5, in accordance with its adjustment, acts to cause pressure against the one spring 14 so that its contacts 16 and 17 are removed from each other, thus causing the current flow in coil 36 to be interrupted. Thereafter heating coil 35 is operated only, until as the result of the further expansion of the thermal probe the second switching mechanism, to the left as shown in Figure 6, interrupts circuit 38, 35, 39. Thereafter, when element 1 again cools, the latter circuit is again closed and thereafter the former circuit. By adjusting knobs 7, the desired temperatures may be regulated from case to case.

In the specific embodiment of Figure 7, the switching mechanisms are connected serially. Contact 18 is connected through terminal 22 to a conductor 42 which is connected to the second switching mechanism terminal 20. From the second switching mechanism terminal 21, conductor 43 leads to the second heating coil 36, the return conductor 44 therefrom being connected directly to the return conductor 39 of the first switching mechanism. The operation of the embodiment of Figure 7 is thus: when the first switching mechanism is caused to operate to disconnect, contact 16 on spring 14 engages contact 18 in the first switching mechanism. From contact 18 the current will now flow over conductor 42 to the second switching mechanism terminal 20, over the second switching mechanism spring 14 and the second switching mechanism terminal 21 and conductor 43 to the second heating coil 36, and thence back over conductors 44 and 39. It will be noted that here again, a single thermal probe serves for both switching mechanisms, and that by suitable adjustment of knobs 7 the instants at which there is disconnection and connection may be controlled as desired.

What I claim is:

1. Electric controller for heating elements comprising a heating element, a line supplying current to the heating element, a thermally responsive device adjacent the heating element and comprising a hollow tube and a rod within the tube one end of which is affixed to an end of the tube and the other end of which extends beyond the other end of the tube at room temperature, the rod having a lower coefficient of expansion than the tube, a housing on which the said other end of the tube is affixed and into which the said other end of the rod extends, and a switching mechanism in the housing comprising an elbow of which one arm is affixed to the said other end of the rod, a pin spring biased against the housing in the other arm of the elbow, a system of levers against a first region of which the pin is adapted to press, a pair of terminals in the line, an S-shaped flat spring of electrically conductive material having one end fixed in one of the pair of terminals and its other end pressingly bearing against a second region of the pair of levers, the said second region being of non-conductive material, the other terminal of the pair engaging the spring at its midportion when the spring is in the preoperated position, the spring being adapted to snap into substantially its mirror-image shape on actuation to a predetermined amount in one direction by the system of levers as the rod on heating withdraws from the housing to press the pin against the first region of the system of levers, whereby the engagement between the said other terminal of the pair and the spring is severed.

2. Electric controller according to claim 1 in which the spring biased pin in the other arm of the elbow carries a knob external the housing, the pin being threaded in the elbow arm, whereby the pin may be adjusted to provide a gap of variable magnitude, including zero, between its inner end and the first region of the system of levers.

3. Electric controller according to claim 1 in which the spring biased pin in the other arm of the elbow carries a knob external the housing, the pin being threaded in the elbow arm, whereby the pin may be adjusted to provide a gap of variable magnitude, including zero, between the inner end of the pin and the first region of the system of levers, and a stop on the system of levers to prevent the second region of the system of levers from disengaging the said other end of the S-shaped spring.

4. Electric controller for heating elements comprising a plurality of heating elements, an electric line supplying current to each of the plurality of heating elements, a single thermally responsive device adjacent the plurality of heating elements and comprising a hollow tube and a rod within the tube one end of which is affixed to an end of the tube and the other end of which extends beyond the other end of the tube at room temperature, the rod having a lower coefficient of expansion than the tube, a housing to which the said other end of the tube is affixed and into which the said other end of the rod extends, a plurality of switching mechanisms within the housing, one switching mechanism for each of the heating elements of the plurality, a bar within the housing affixed to the said other end of the rod, a plurality of projections integral with the bar, one projection for each of switching mechanisms, each of the plurality of switching mechanisms comprising individual to it, a switch operating pin adjustably mounted in the projection, a system of levers against a first region of which the switch operating pin is adapted to press in response to the expansion of the rod, a pair of electric terminals, an S-shaped spring of electrically conductive material having one end fixed in one of the pair of terminals and its other end bearing against a second region of the system of levers, the said second region being of electrically nonconductive material, the other terminal of the pair engaging the mid region of the spring when the spring is in the preoperated position, the spring being adapted to snap into substantially its image shape on actuation a predetermined amount in one direction by the system of levers under the pressure of the operating pin to sever the engagement between the said other terminal of the pair and the midregion of the spring and a control knob externally the housing on the operating pin; the pairs of terminals of all the switching mechanisms being connected in parallel to each other to the line, whereby on variably positioning the respective operating pins by adjustment of their control knobs, the switching mechanisms are actuated at different instances of time to disconnect the heating elements of the plurality from the line when the thermally responsive device is heated to predetermined temperatures and to reconnect the heating elements to the line in the reverse order of their disconnection when the thermally responsive device cools to predetermined lower temperatures.

5. Electric controller for heating elements comprising a plurality of heating elements, a single thermally responsive device adjacent the plurality of heating elements and comprising a hollow tube and a rod within the tube one end of which is affixed to an end of the tube and the other end of which extends beyond the other end of the tube at room temperature, the rod having a lower coefficient of expansion than the tube, a housing to which the said other end of the tube is affixed and into which the said other end of the rod extends, a plurality of switching mechanisms within the housing, one switching mechanism for each heating element of the plurality, a bar within the housing affixed to the said other end of the rod, a plurality of projections integral with the bar, one projection for each of the switching mechanisms, each of the switching mechanisms comprising individual to it a switch operating pin adjustably positioned in the projection, a system of levers against a first region of which the switch operating pin is adapted to press in response to the expansion of the rod, a pair of electrical terminals, an S-shaped flat spring of electrically conductive material having one end fixed in one of the pair of terminals and its other end bearing against a second region of the system of levers, the said second region being of electrically nonconductive material, the other terminal of the pair engaging the midregion of the spring when the spring is in the preoperated position, the spring being adapted to snap into substantially its image shape on actuation a predetermined amount in one direction by the system of levers under the pressure of the operating pin to sever the engagement between the said other terminal of the pair and the midregion of the spring, and a control knob externally the housing on the operating pin, a supply of line current, the pair of terminals of one of the switching mechanisms of the plurality being connected to the line current supply, each of the switching mechanisms including the said one switching mechanism but excluding a last one of the switching mechanisms of the plurality including a third electrical terminal positioned to engage the midregion of the spring of the respective switching mechanism when said spring is snapped into its image shape, a conductive connection from each third electrical terminal to the said one terminal of the pair of the next succeeding switching mechanism in which the said one end of the S-shaped spring of the last mentioned mechanism is fixed, whereby the supply of line current is connected successively to the successive heating elements of the plurality on disconnection of the immediately preceding heating element of the plurality at the predetermined temperatures of the thermally responsive device in accordance with the adjustment of the control pins in the projections.

6. Electric controller for heating elements comprising a plate of heat conducting material, at least one heating means embedded within the plate, a thermally responsive device adjacent the plate and comprising a hollow tube and a rod within the tube one end of which is affixed to an end of the tube and the other end of which extends beyond the other end of the tube at room temperature, the rod having a lower coefficient of expansion than the tube, a housing on which the said other end of the tube is affixed and into which said other end of the rod extends, and a switching means in the housing for each electrical heating means and comprising a substantially U-shaped member of which one arm is affixed to the said other end of the rod, a pin spring biased against the housing engaging the other arm of the U-shaped member, a first pivoted lever against which the pin is adapted to press upon a predetermined motion of the said other end of the rod in the direction outwardly the housing, a second pivoted lever actuable by the first lever, an S-shaped spring of electrically conductive material, an electrical supply line, and two terminals cooperating with the S-shaped spring each of which terminals is connected to one side of the line, one end of the S-shaped spring being mechanically supported on one of the terminals while the other end thereof pressingly bears against the second lever at an electrically nonconductive portion thereof, the other terminal engaging the spring when the spring is in preoperated position and being out of engagement therewith when the spring on actuation of the second lever a predetermined amount snaps into substantially its mirror image.

7. Electric controller for heating elements according to claim 6 having a plurality of heating means embedded within the plate in which the one arm of the U-shaped member of each switching means affixed to the said other end of the rod is made common to all of the plurality of U-shaped members, and the spring biased pin of each switching means is adjustable and is adjusted to a bias corresponding to a predetermined temperature of the plate, the adjustment of each spring biased pin differing from that of each other spring biased pin.

8. Electric controller for heating elements according to claim 6 having a plurality of heating means embedded within the plate in which the one arm of each U-shaped member affixed to the said other end of the rod is made common to the plurality of U-shaped members, the spring biased pin of each switching mechanism is adjustable and is adjusted to a bias corresponding to a predetermined temperature of the plate, the adjustment of each spring biased pin differing from that of each other spring biased pin, and the two line terminals of each switching means are connected electrically in parallel.

9. Electric controller for heating elements according to claim 6 having a plurality of heating means embedded within the plate in which the one arm of each U-shaped member affixed to the said other end of the rod is made common to the plurality of U-shaped members, the spring biased pin of each switching means is adjustable and is adjusted to a bias corresponding to a predetermined temperature of the plate, the adjustment of each spring biased pin differing from that of each other spring biased pin, and each switching means is electrically connected in series to the other switching means of the plurality.

THEODOR STIEBEL.

References Cited in the file of this patent

UNITED STATES PATENTS

| Number | Name | Date |
| --- | --- | --- |
| 1,718,412 | Crooker et al. | June 25, 1929 |
| 1,884,232 | Rehm | Oct. 25, 1932 |
| 1,912,921 | Spencer | June 6, 1933 |
| 1,963,655 | Fichtner | June 19, 1934 |
| 2,002,692 | Dahl | May 28, 1935 |
| 2,104,848 | Clark | Jan. 11, 1938 |
| 2,310,543 | Pearce | Feb. 9, 1943 |
| 2,435,530 | Candor | Feb. 3, 1948 |
| 2,437,262 | Levitt et al. | Mar. 9, 1948 |
| 2,509,747 | Seiter | May 30, 1950 |
| 2,517,253 | Spaeth | Aug. 1, 1950 |
| 2,562,399 | Trozmuller | July 31, 1951 |